United States Patent
Tang et al.

(10) Patent No.: US 9,658,114 B1
(45) Date of Patent: May 23, 2017

(54) DEVICE FOR MEASURING POINT DIFFRACTION INTERFEROMETRIC WAVEFRONT ABERRATION AND METHOD FOR DETECTING WAVE ABERRATION

(71) Applicant: Shanghai Institute of Optics And Fine Mechanics, Chinese Academy of Sciences, Shanghai (CN)

(72) Inventors: Feng Tang, Shanghai (CN); Xiangzhao Wang, Shanghai (CN); Peng Feng, Shanghai (CN); Fudong Guo, Shanghai (CN); Yunjun Lu, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 0 days.

(21) Appl. No.: 14/986,593

(22) Filed: Dec. 31, 2015

(30) Foreign Application Priority Data

Dec. 24, 2015 (CN) .......................... 2015 1 0982725

(51) Int. Cl.
*G01M 11/02* (2006.01)
*G01J 9/02* (2006.01)
(52) U.S. Cl.
CPC ...................... *G01J 9/02* (2013.01)
(58) Field of Classification Search
CPC .. G01M 11/00; G01M 11/02; G01M 11/0242; G01M 11/0271
See application file for complete search history.

(56) References Cited

U.S. PATENT DOCUMENTS

| 2004/0174532 A1* | 9/2004 | Nakauchi | G01J 9/02 356/515 |
| 2006/0104181 A1* | 5/2006 | Tabuchi | G11B 7/08582 369/112.01 |
| 2006/0262323 A1* | 11/2006 | Yamamoto | G03F 7/706 356/515 |
| 2007/0019175 A1* | 1/2007 | Ohsaki | G01M 11/02 355/55 |

FOREIGN PATENT DOCUMENTS

CN 201310126148.5 A 8/2013

OTHER PUBLICATIONS

U.S. Appl. No. 14/986,560, filed Dec. 31, 2015, Xiangzhao Wang et al.

* cited by examiner

*Primary Examiner* — Jonathan Hansen
(74) *Attorney, Agent, or Firm* — Mei & Mark LLP; Manni Li

(57) ABSTRACT

A device for measuring point diffraction interferometric wavefront aberration having an optical source, an optical splitter, a first light intensity and polarization regulator, a phase shifter, a second light intensity and polarization regulator, an ideal wavefront generator, an object precision adjusting stage, a measured optical system, an image wavefront detection unit, an image precision adjusting stage, and a data processing unit. A method for detecting wavefront aberration of the optical system by using the device is also disclosed.

19 Claims, 9 Drawing Sheets

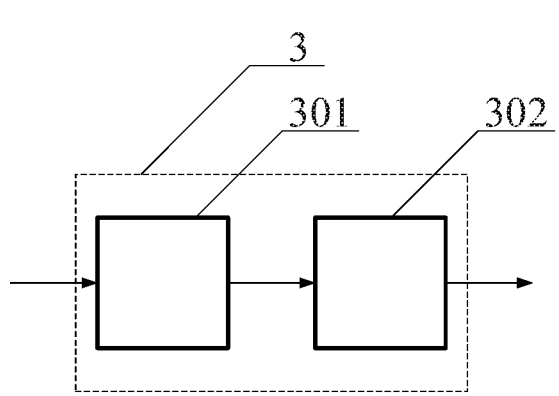
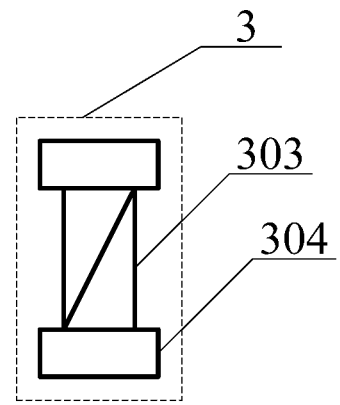
Figure 2(a)       Figure 2(b)
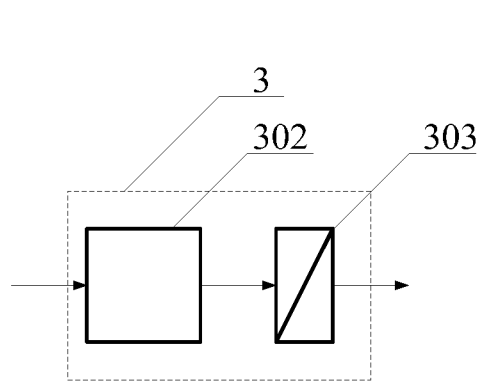
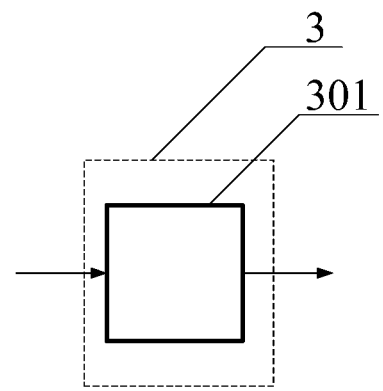
Figure 2(c)       Figure 2(d)
Figure 2

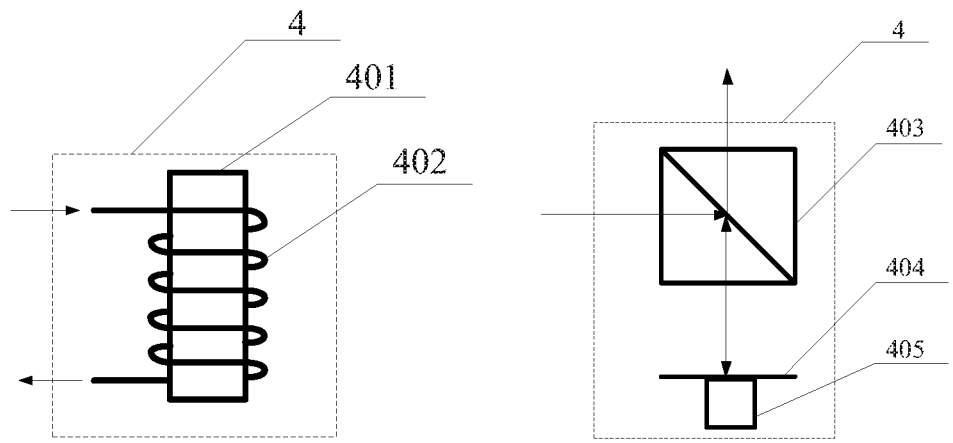
Figure 3(a)　　　　　Figure 3(b)
Figure 3
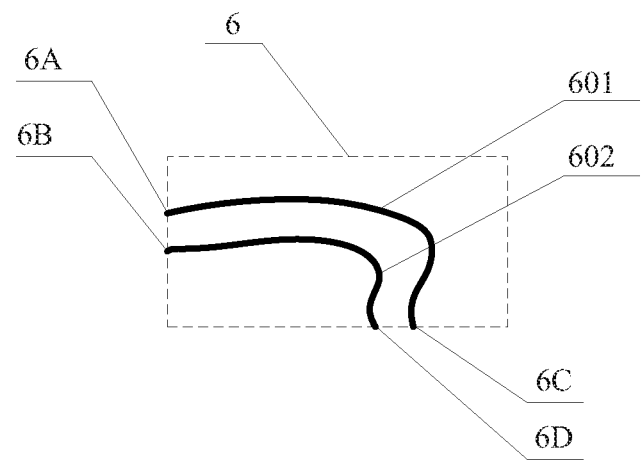
Figure 4

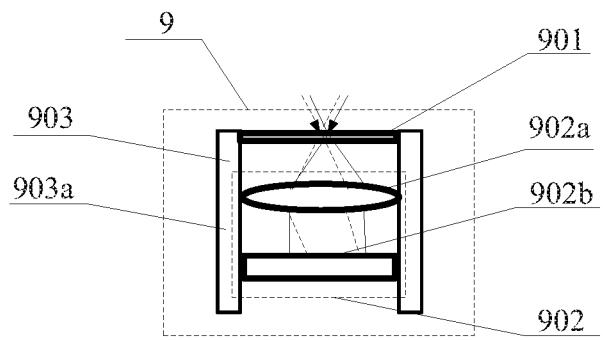
Figure 8(a)
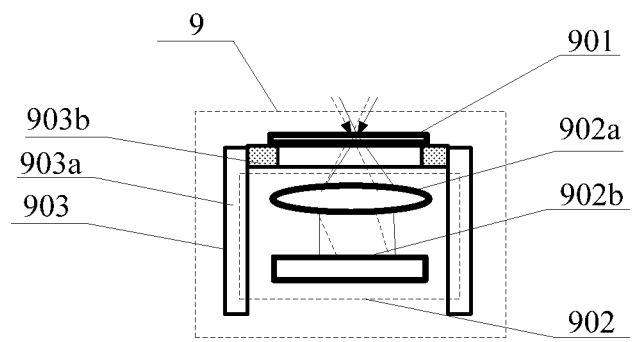
Figure 8(b)
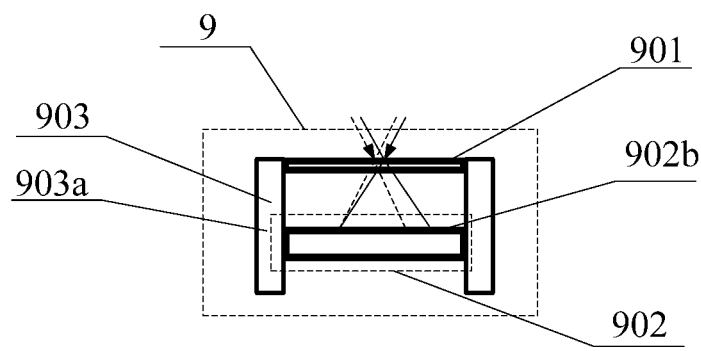
Figure 8(c)
Figure 8

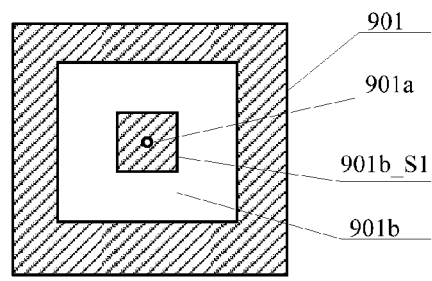
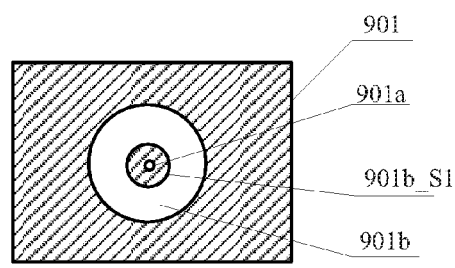
Figure 9(a)                Figure 9(b)
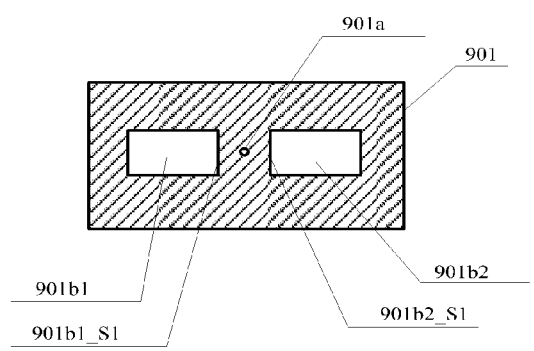
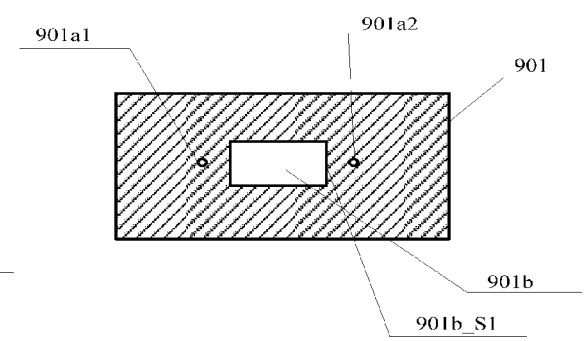
Figure 9(c)                Figure 9(d)
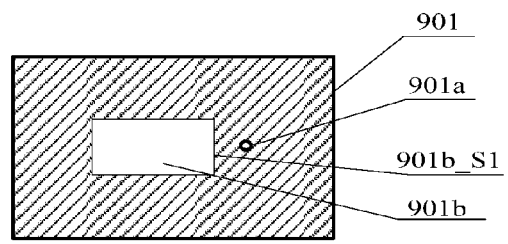
Figure 9(e)
Figure 9

DEVICE FOR MEASURING POINT DIFFRACTION INTERFEROMETRIC WAVEFRONT ABERRATION AND METHOD FOR DETECTING WAVE ABERRATION

CROSS-REFERENCE AND RELATED APPLICATION

The subject application claims priority on Chinese patent application CN201510982725.X filed on Dec. 24, 2015. The contents and subject matters of the priority application is incorporated herein by reference.

FIELD OF INVENTION

The present invention relates to interferometry, particularly, a device for measuring point diffraction interferometric wavefront aberration and method for detecting wavefront aberration of the optical system thereof.

BACKGROUND ART

Wavefront aberration is an importance parameter in depicting the properties of a small-aberration imaging optical system. Wavefront aberration of a high quality microscopic objective or a spatial telescope needs to be smaller than $\lambda/4$ PV or $\lambda/14$ RMS (where $\lambda$ is an operating wavelength, and RMS is a root mean square value). Wavefront aberration of a deep UV lithographic projection lens needs to be in a few nm RMS, while that of an EUV needs to be less than 1 nm RMS, which are demanding requirements for wavefront aberration techniques.

A point diffraction interferometric wavefront aberration measuring device and a detecting method is proposed in Chinese Patent Application No. 201310126148.5 to Tang, Feng et al., two standard spherical waves are generated on an object plane of a measured optical system, the light intensity, polarization states, and optical path difference thereof being adjustable for producing high interference visibility, and the measured results being able to eliminate the system errors. Nevertheless, for one thing, the interferometer needs to generate two standard spherical waves on the object plane of the measured optical system, which increases system complexity and cost, and the alignment is extremely difficult when the standard spherical waves are generated via keyhole components. Secondly, the interferometer has low light use efficiency due to reduced light output efficiency for generation of two standard spherical waves on the object plane, and further reduced light output efficiency when re-generation of the standard spherical waves via the filtering circular hole on the image mask after imaging of the two standard spherical waves on the image plane; detection repeatability is negatively impacted due to reduced frame speed of the measuring system and increased sensitivity to vibration and other disturbance resulting from increased exposure time to obtain sufficiently clear interferograms. Thirdly, the interferometer requires that both the first output port and the second output port are situated on the object plane of the measured optical system, which increases requirement for system precision and operation complexity.

SUMMARY OF THE INVENTION

The present invention overcomes the defects of prior art of the current technology and provides a device for measuring point diffraction interferometric wavefront aberration and a method for detecting wavefront aberration of the optical system thereof, so as to realize high precision detection of the wavefront aberration of the optical system thereof. The measuring device of the present invention needs only to generate one path of a standard spherical wave output on an object plane of the measured optical system, thereby reducing system complexity and increasing light use efficiency; the measuring system reduces precision requirement and operating complexity of the system as well.

The device for measuring point diffraction interferometric wavefront aberration of the present invention comprises an optical source, an optical splitter, a first light intensity and polarization regulator, a phase shifter, a second light intensity and polarization regulator, an ideal wavefront and point light source generator, an object precision adjusting stage, a measured optical system, an image wavefront detection unit, an image precision adjusting stage, and a data processing unit. The image wavefront detection unit is composed of an image mask, a photoelectric sensor, and a support, with the image mask comprising a transmittance band and a filtering circular hole, the photoelectric sensor comprising a two-dimensional detector. The ideal wavefront and point light source generator is an optical component transforming a light inputted from a first input port thereof to a standard spherical wave in a scope of an object numerical aperture of the measured optical system which is subsequently outputted from an ideal wavefront output port thereof, and transforming a light of a second input port thereof to a point light source, but not an ideal spherical wave, and with an output numerical aperture equal to or greater than the object numerical aperture of the measured optical system, and which is subsequently outputted from a point light source output port thereof; the center distance between the ideal wavefront output port and the point light source output port of the ideal wavefront and point light source generator is greater than the ratio of the diameter of an image point dispersion speckle of the measured optical system over the amplification factor thereof; the ideal wavefront output port of the ideal wavefront and point light source generator is situated on an object plane of the measured optical system, and the point light source output port of the ideal wavefront and point light source generator is situated on or is proximate to the object plane of the measured optical system.

A method for detecting a wavefront aberration of the measured optical system of the point diffraction interferometric wavefront aberration measuring device of the present invention, comprises the following steps:

1) moving the object precision adjusting stage so that the ideal wavefront output port of the ideal wavefront and point light source generator is situated in a position of a field of view point for detection of the measured optical system;

2) moving the image precision adjusting stage and conducting a precision alignment, so that an image point of the ideal wavefront output port of the ideal wavefront and point light source generator is aligned with the center of a filtering circular hole of the image mask, and an image point of the point light source output port is situated inside a transmittance band of the image mask;

3) adjusting the first light intensity and polarization regulator and the second light intensity and polarization regulator so that the intensity of an interferogram collected by the photoelectric sensor reaches 0.6-0.9 of the saturation intensity of the photoelectric sensor, and the interference visibility thereof reaches above 0.6; phase shifting for a phase shift phase $\delta$ via the phase shifter for m times, wherein m is a positive integer greater than 2, with each time the photoelectric sensor collecting an interferogram, to obtain a sequence of m interferograms: Ia1, Ia2, ..., Iam; conducting phase extraction and phase-unwrapping on the sequence of the m interferograms to obtain a phase distribution $W_a$;

4) conducting precision alignment so that the image points of both output ports of the ideal wavefront and point light source generator are situated inside the transmittance band of the image mask;

5) adjusting the first light intensity and polarization regulator and the second light intensity and polarization regulator so that the intensity of an interferogram collected by the photoelectric sensor reaches 0.6-0.9 of the saturation intensity of the photoelectric sensor, and the interference visibility thereof reaches above 0.6; phase shifting for a phase shift phase δ via the phase shifter for m times, wherein m is a positive integer greater than 2, with each time the photoelectric sensor collecting an interferogram, to obtain a sequence of m interferograms: Ia1, Ia2, ..., Ibm; conducting phase extraction and phase-unwrapping on the sequence of the m interferograms to obtain a phase distribution $W_b$;

6) calculating the wave aberration W of the measured optical system at the field of view point via the expression $W=W_a-W_b$.

The present invention is advantageous in the following aspects:

1) The ideal wavefront and point light source generator needs only to generate one path of a standard spherical wave output, with the other path only a point light source, thereby reducing system complexity and increasing light use efficiency.

2) Only the ideal wavefront output port needs to be on an object plane of the measured optical system, the point light source output port needs only to be proximate to the object plane of the measured optical system, thereby reducing precision requirement and operating complexity of the system.

BRIEF DESCRIPTION OF THE DRAWINGS

FIG. 2 has multiple schematic diagrams showing embodiments of the first light intensity and polarization regulator of the present invention, among which FIG. 2(a) is a schematic diagram showing the first embodiment of the first light intensity and polarization regulator of the present invention; FIG. 2(b) is a schematic diagram showing the second embodiment of the first light intensity and polarization regulator of the present invention; FIG. 2(c) is a schematic diagram showing the third embodiment of the first light intensity and polarization regulator of the present invention; FIG. 2(d) is a schematic diagram showing the fourth embodiment of the first light intensity and polarization regulator of the present invention.

FIG. 3 has schematic diagrams showing embodiments of the phase shifter of the present invention, among which FIG. 3(a) is a schematic diagram showing the first embodiment of the phase shifter of the present invention; FIG. 3(b) is a schematic diagram showing the second embodiment of the phase shifter of the present invention.

FIG. 4 is a schematic diagram showing the first embodiment of the ideal wavefront and point light source generator of the present invention.

FIG. 8 has multiple schematic diagrams showing embodiments of the image wavefront detection unit of the present invention, among which FIG. 8(a) is a schematic diagram showing the first embodiment of the image wavefront detection unit of the present invention; FIG. 8(b) is a schematic diagram showing the second embodiment of the image wavefront detection unit of the present invention; FIG. 8(c) is a schematic diagram showing the third embodiment of the image wavefront detection unit of the present invention.

FIG. 9 has multiple schematic diagrams showing embodiments of the image mask of the present invention, among which FIG. 9(a) is a schematic diagram showing the first embodiment of the image mask of the present invention; FIG. 9(b) is a schematic diagram showing the second embodiment of the image mask of the present invention; FIG. 9(c) is a schematic diagram showing the third embodiment of the image mask of the present invention; FIG. 9(d) is a schematic diagram showing the fourth embodiment of the image mask of the present invention; and FIG. 9(e) is a schematic diagram showing the fifth embodiment of the image mask of the present invention.

DETAILED DESCRIPTION OF THE INVENTION AND EMBODIMENTS

In combination with drawings and embodiments hereunder provided, the present invention is further enunciated, but shall not be restricted in respect of the scope of protection.

Figure 1:
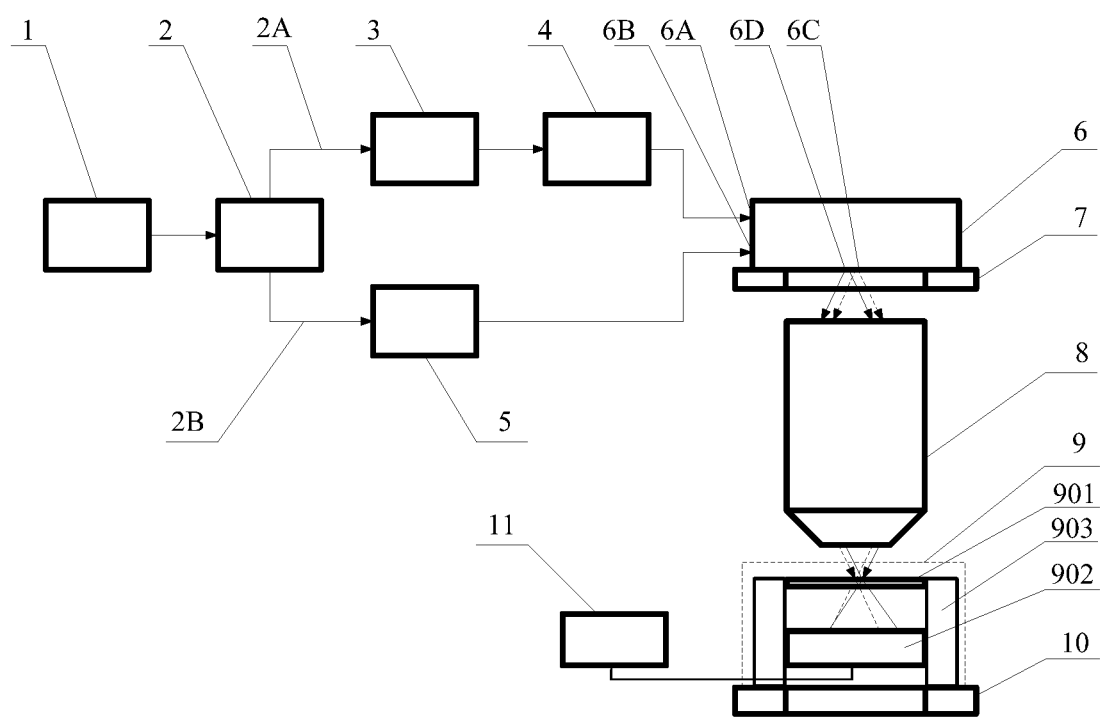
FIG. 1 is a schematic diagram showing the point diffraction interferometric wavefront aberration measuring device of the present invention.

As shown on FIG. 1, the point diffraction interferometric wavefront aberration measuring device of the present invention comprises an optical source 1, an optical splitter 2, a first light intensity and polarization regulator 3, a phase shifter 4, a second light intensity and polarization regulator 5, an ideal wavefront and point light source generator 6, an object precision adjusting stage 7, a measured optical system 8, an image wavefront detection unit 9, an image precision adjusting stage 10, and a data processing unit 11. The image wavefront detection unit 9 is composed of an image mask 901, a photoelectric sensor 902, and a support 903, with the image mask 901 comprising a transmittance band 901b and a filtering circular hole 901a (which might be in plural, such as a first filtering circular hole 901a1, and a second filtering circular hole 901a2), the photoelectric sensor 902 comprising a two-dimensional detector 902b. The ideal wavefront and point light source generator 6 is an optical component transforming a light inputted from a first input port 6A thereof to a standard spherical wave in a scope of an object numerical aperture of the measured optical system 8, which is subsequently outputted from an ideal wavefront output port 6C thereof, and transforming a light of a second input port 6B thereof to a point light source, but not an ideal spherical wave, and with an output numerical aperture equal to or greater than the object numerical aperture of the measured optical system 8, and which is subsequently outputted from a point light source output port 6D thereof.

The center distance between the ideal wavefront output port 6C and the point light source output port 6D of the ideal wavefront and point light source generator 6 is greater than the ratio of the diameter of an image point dispersion speckle of the measured optical system 8 over the amplification factor thereof.

In the device of the present invention, the optical splitter 2 is along the advancing direction of the path of the output light of the optical source 1. The optical splitter 2 splits an incident light into a light path adjustable light path 2A and a light-path-fixed light path 2B. Along the light path, adjustable light path 2A are connected the first light intensity and polarization regulator 3, the phase shifter 4, and is subsequently connected the first input port 6A of the ideal wavefront and point light source generator 6, where the first light intensity and polarization regulator 3 is placed prior to or subsequent to the phase shifter 4. The second light intensity and polarization regulator 5 is arranged along the light-path-fixed light path 2B, and subsequently is connected the second input port 6B of the ideal wavefront and point light source generator 6. The ideal wavefront output port 6C of the ideal wavefront and point light source generator 6 is situated on an object plane of the measured optical system 8, and the point light source output port 6D thereof is situated on or is proximate to the object plane of the measured optical system 8. The ideal wavefront and point light source generator 6 is supported and precision positioned by the object precision adjusting stage 7. The image wavefront detection unit 9 is situated on the image side of the measured optical system 8, the image mask 901 of the image wavefront detection unit 9 is situated on an image plane of the measured optical system 8, and the two-dimensional detector 902b of the photoelectric sensor 902 is situated subsequent to the image mask 901 along the advancing direction of the light. The image wavefront detection unit 9 is supported and precision positioned by the image precision adjusting stage 10. The output signal of the image wavefront detection unit 9 is inputted to the data processing unit 11.

The working principle and working process of the present invention is as follows: the output light of the light source 1 is split via the optical splitter 2 into two paths, and the light path adjustable light path 2A and the light-path-fixed light path 2B. The light passing along the light path adjustable light path 2A and the light-path-fixed light path 2B generates respectively a standard spherical wave on the ideal wavefront output port 6C of the ideal wavefront and point light source generator 6, and a point light source on the point light source output port 6D thereof. The object precision adjusting stage 7 adjusts the ideal wavefront output port 6C of the ideal wavefront and point light source generator 6 to a position of the field of view point for detection in the object field of view of the measured optical system 8. A standard spherical wave has no wavefront aberration, that is, the wavefront aberration of a standard spherical wave $W_s=0$, and hence the standard spherical wave passing though the measured optical system 8 carries the wavefront aberration of the ideal wavefront output port 6C at the field of view point, the wavefront aberration of the measured optical system 8 at the field of view point of the ideal wavefront output port 6C of the ideal wavefront and point light source generator 6 being denoted as W. The wavefront aberration of the output light of the point light source output port 6D having passed through the measured optical system 8 is denoted as $W_e$.

Move the image precision adjusting stage 10 so that the image point of the ideal wavefront output port 6C of the ideal wavefront and point light source generator 6 is aligned with the center of the filtering circular hole 901a of the image mask 901, and the image point of the point light source output port 6D is situated inside a transmittance band 901b of the image mask 901. The wavefront penetrating the filtering circular hole 901a is a standard spherical wave once again, with a wavefront aberration being $W_s=0$. The wavefront passing through the transmittance band 901b undergoes no change, with the wavefront aberration remaining equal to the wavefront aberration $W_e$ of the output light of the point light source output port 6D having passed through the measured optical system 8; the free space and optical components in-between the image mask 901 and the two-dimensional detector 902b introduce an interferometric system error $W_{sys}$ to the two wavefronts of the image mask 901; with the mutual interference between the two wavefronts, the phase distribution $W_a$ carried by the interferogram is as shown in expression (1):

$$W_a = W_e - W_S + W_{SYS} = W_e + W_{SYS} \qquad (1)$$

Move the image precision adjusting stage 10 so that both the image points of the ideal wavefront and point light source generator 6 are situated inside the transmittance band 901b of the image mask 901. The two wavefronts passing through the transmittance band 901b undergoes no change, respectively being the wavefront aberration W of the measured optical system 8 at the field of view point of the ideal wavefront output port 6C of the ideal wavefront and point light source generator 6 and the wavefront aberration $W_e$ of the output light of the point light source output port 6D having passed through the measured optical system 8. The free space and optical components in-between the image mask 901 and the two-dimensional detector 902b introduce an interferometric system error $W_{sys}$ via the two wavefronts of the image mask 901. With the mutual interference between the two wavefronts, the phase distribution $W_b$ carried by the interferogram is shown in expression (2):

$$W_b = W_e - W + W_{SYS} \qquad (2)$$

Thus, the wavefront aberration W of the ideal wavefront output port 6C of the ideal wavefront and point light source generator 6 at the field of view point is obtained via expression (3):

$$W = W_a - W_b \qquad (3)$$

As the two wavefronts passing through the image mask 901 come respectively from the light path adjustable light path 2A and the light-path-fixed light path 2B, by adjusting the first light intensity and polarization regulator 3 on the light path adjustable light path 2A, the light intensity and polarization of one wavefront may be regulated by adjusting the second light intensity and polarization regulator 5 on the light-path-fixed light path 2B, the light intensity and polarization of another wavefront may be regulated. When the polarization and light intensity of the two wavefronts are respectively equal one to another, the interference visibility arrives at its maximum value 1. When the polarization of the two wavefronts are both linearly polarized, and the polarization directions are perpendicular one to another, no interference takes place, and the interference visibility is 0. When the two wavefronts have identical polarization, with the light intensity of one wavefront being $I_{w1}$, the light intensity of the other one being $I_{w2}$, the interference visibility $\eta$ is shown in expression (4):

$$\eta = \frac{2\sqrt{I_{W1}I_{W2}}}{I_{W1}+I_{W2}} \qquad (4)$$

Hence, by adjusting the first light intensity and polarization regulator 3 and the second light intensity and polarization regulator 5, a higher interference visibility is realized.

Also as the two wavefronts passing through the image mask 901 come respectively from the light path adjustable light path 2A and the light-path-fixed light path 2B, by adjusting the light path of the light path adjustable light path 2A via the phase shifter, the phase of one wave front changes and generates a phase shift, and thus high precision detection is realized by means of phase shift interferometry.

FIG. 2 shows multiple schematic diagrams of multiple embodiments of the first light intensity and polarization regulator 3 of the present invention. The first light intensity and polarization regulator 3 as shown on FIG. 2(*a*) is composed of an adjustable attenuator 301 and a polarization controller 302; the adjustable attenuator 301 is connected prior to or subsequent to the polarization controller 302 along the advancing direction of light.

The first light intensity and polarization regulator 3 as shown on FIG. 2(*b*) is composed of a polarization analyzer 303 and a rotary stage 304; the rotary stage 304 rotates the polarization analyzer 303 to change the direction of the transmission axis of the polarization analyzer 303, thereby changing the polarization and light intensity of the output light.

The first light intensity and polarization regulator 3 as shown on FIG. 2(*c*) is composed of a polarization controller 302 and a polarization analyzer 303; the polarization controller 302 and the polarization analyzer 30 are successively connected along the advancing direction of light; by adjusting the polarization of light via the polarization controller 302, the light intensity of the polarization analyzer 303 is changed.

The first light intensity and polarization regulator 3 as shown on FIG. 2(*d*) is an adjustable attenuator 301, and only adjusts light power along the light path.

The second light intensity and polarization regulator 5 might adopt a structure identical to, or different from, that of the first light intensity and polarization regulator 3.

FIG. 3 shows two schematic diagrams of two embodiments of the phase shifter 4 of the present invention. The phase shifter 4 as shown on FIG. 3(*a*) is composed of a columnar piezoelectric ceramic 401 and a single-mode fiber loop 402 winding thereon; by changing the driving voltage of the columnar piezoelectric ceramic 401, the diameter of the columnar piezoelectric ceramic 401 changes, thus the length of the single-mode fiber loop 402 and thereby the light path is changed.

The phase shifter 4 as shown on FIG. 3(*b*) is composed of a beam splitter prism 403, a reflector 404, and a piezoelectric ceramic 405; along the direction of the incident light is arranged the beam splitter prism 403, and the reflector 404 is arranged in the direction of the reflection light of the beam splitter prism; light reflected by the reflector 404 comes out via the beam splitter prism 403; as the reflector 404 is mounted on the piezoelectric ceramic 405, by changing the driving voltage of the piezoelectric ceramic 405, the length of the piezoelectric ceramic 405 is changed to move the reflector 404, thus changing the light path.

FIG. 4 is a schematic diagram of the first embodiment of the ideal wavefront and point light source generator 6 of the present invention. As shown on FIG. 4, the first embodiment of the ideal wavefront and point light source generator 6 is composed of a first fiber 601 and a second fiber 602. The input port of the first fiber is the first input port 6A of the ideal wavefront and point light source generator 6, while the output port thereof is the ideal wavefront output port 6C of the ideal wavefront and point light source generator 6. The input port of the second fiber is the second input port 6B of the ideal wavefront and point light source generator 6, while the output port thereof is the point light source output port 6D of the ideal wavefront and point light source generator 6. The first fiber 601 is a single-mode fiber, the first fiber 601 may also be polarization maintaining fiber. The fiber core diameter $\Phi_f$ of the output port of the first fiber 601 is smaller than the object diffraction limited resolution of the measured optical system 8, and satisfying $\Phi_f<\lambda/(2NA_o)$, where $\lambda$ is the wavelength of the light source, and $NA_o$ is the object numerical aperture of the measured optical system 8. The second fiber 602 is a single-mode fiber, and the second fiber 602 may also be polarization maintaining fiber. The fiber core diameter $\Phi_f$ of the output port of the second fiber 602 is greater than the object diffraction limited resolution of the measured optical system 8, and satisfying $\Phi_{f2}>\lambda/(2NA_o)$, and further, the output numerical aperture thereof is greater than or equal to the object numerical aperture of the measured optical system 8. Since the first fiber 601 is a single-mode fiber or a polarization maintaining fiber, there is only one transmission mode in the fiber, and since the fiber core diameter $\Phi_f$ of the output port thereof is smaller than the object diffraction limited resolution of the measured optical system 8, the output light field is a standard spherical wave within the object numerical aperture $NA_o$ of the measured optical system 8, with the input light of the first input port 6A thereof being transformed into a standard spherical wave and being outputted from the ideal wavefront output port 6C. The center distance between the fiber cores of the output ports of the first fiber 601 and the second fiber 602 is greater than the ratio of the diameter of the image point dispersion speckle of the measured optical system 8 over the amplification factor thereof. For example, the diameter of the image point dispersion speckle of the measured optical system 8 being 2 μm, and the amplification factor being 1/5, then the center distance between the fiber cores of the output ports of the first fiber 601 and the second fiber 602 is greater than 10 μm.

Figure 5:
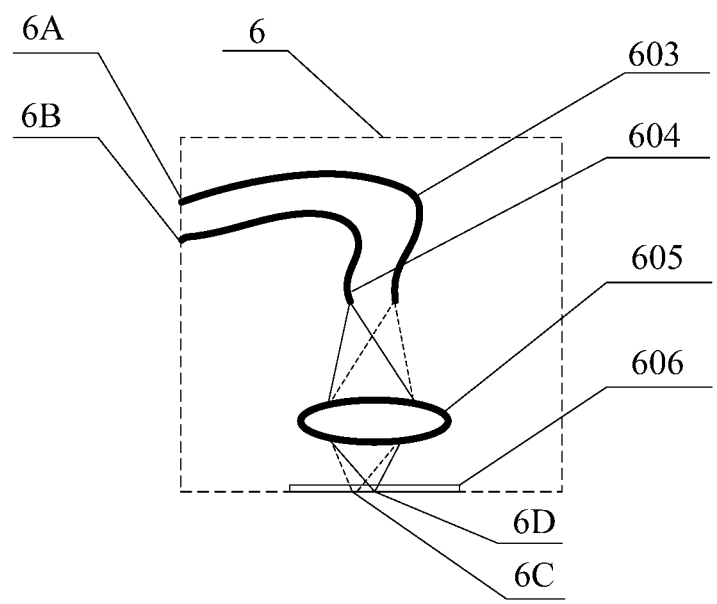
FIG. 5 is a schematic diagram showing the second embodiment of the ideal wavefront and point light source generator of the present invention.
Figure 6:
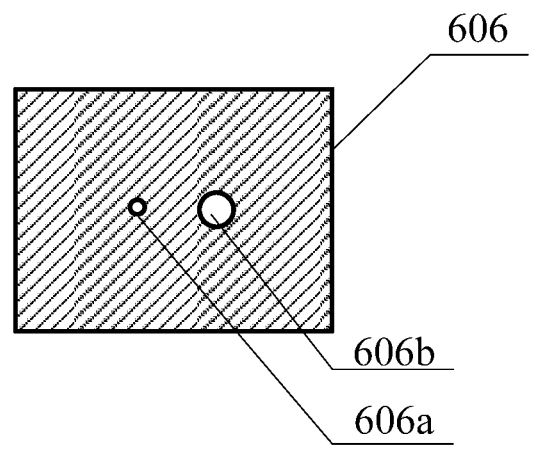
FIG. 6 is a schematic diagram showing an object plane mask for an embodiment of the ideal wavefront generator of the present invention.

FIG. 5 is a schematic diagram showing the second embodiment of the ideal wavefront and point light source generator 6 of the present invention. The ideal wavefront and point light source generator 6 is alternatively composed of a third fiber 603, a fourth fiber 604, an imaging mirror set 605, and an object plane mask 606, with FIG. 6 showing a schematic diagram of the object plane mask 606; the input port of the third fiber 603 is the first input port 6A of the ideal wavefront and point light source generator 6, while the output port thereof is on an object plane of the imaging mirror set 605. The input port of the fourth fiber is the second input port 6B of the ideal wavefront and point light source generator 6, while the output port thereof is on an object plane of the imaging mirror set 605. The object plane mask 606 is on an image plane of the imaging mirror set 605. On the object plane mask 606 are arranged a first circular hole 606a and a second circular hole 606b. The first circular hole 606a is the ideal wavefront output port 6C of the ideal wavefront and point light source generator 6, while the second circular hole 606b is the point light source output port 6D of the ideal wavefront and point light source generator 6. The output port of the third fiber 603 is imaged on the first circular hole 606a via the imaging mirror set 605, while the output port of the fourth fiber 604 is imaged on the second circular hole 606a via the imaging mirror set 605. The third fiber 603 and the second fiber 604 is each either a single-mode fiber or a polarization maintaining fiber. The diameter $\Phi_o$ of the first circular hole 606a is smaller than the object diffraction limited resolution of the measured optical system 8, and satisfying $\Phi_o<\lambda/(2NA_o)$, wherein $\lambda$ is the wavelength of the light source, and $NA_o$ is the object numerical aperture of the measured optical system 8. The diameter $\Phi_{o2}$ of the second circular hole 606b is greater than the object diffraction limited resolution of the measured optical system 8, and satisfying $\Phi_{o2}>\lambda/(2NA_o)$. The first circular hole 606a on the object plane mask 606 has a filtering effect on a light field, and since the diameter $\Phi_o$ of the first circular hole 606a is smaller than the object diffraction limited resolution of the measured optical system 8, the output light field of the first circular hole 606a is a standard spherical wave within the object numerical aperture $NA_o$ of the measured optical system 8. The input light of the first input port 6A is transformed into a standard spherical wave and is outputted from the ideal wavefront output port 6C. The center distance between the first circular hole 606a and the second circular hole 606b on the object plane mask 606 is greater than the ratio of the diameter of the image point dispersion speckle of the measured optical system 8 over the amplification factor thereof. For example, the diameter of the image point dispersion speckle of the measured optical system 8 being 1 μm, and the amplification factor being 1/5, then the center distance between the first circular hole 606a and the second circular hole 606b is greater than 5 μm. The ratio of the output numerical aperture of the fourth fiber over the amplification factor of the imaging mirror set 605 is greater than or equal to the object numerical aperture of the measured optical system 8.

Figure 7:
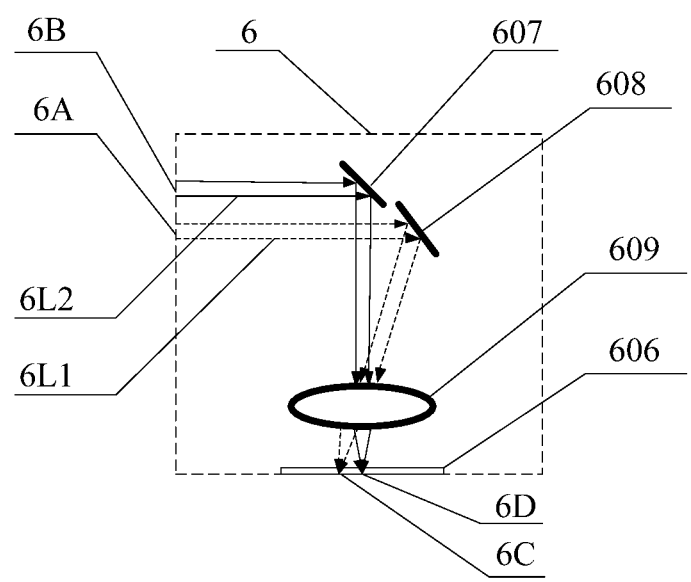
FIG. 7 is a schematic diagram of the third embodiment of the ideal wavefront and point light source generator of the present invention.

FIG. 7 is a schematic diagram of the third embodiment of the ideal wavefront and point light source generator 6 of the present invention. The ideal wavefront and point light source generator 6 is composed of a first reflector 607, a second reflector 608, a focusing mirror set 609, and the object plane mask 606. Two beams of collimated light, a first light beam 6L1, and a second light beam 6L2, are respectively inputted from the first input port 6A and the second input port 6B of the ideal wavefront and point light source generator 6. Along the advancing direction of the first light beam 6L1 are successively the first reflector 607, the focusing mirror set 609, and the object plane mask 606. Along the advancing direction of the second light beam 6L2 are successively the second reflector 608, the focusing mirror set 609, and the object plane mask 606. The object plane mask 606 is on a rear focus plane of the focusing mirror set 609; the first circular hole 606a on the object plane mask 606 is the ideal wavefront output port 6C of the ideal wavefront and point light source generator 6, while the second circular hole 606b thereon is the point light source output port 6D of the ideal wavefront and point light source generator 6. An angle exists between the first reflector 607 and the second reflector 608, so that the first light beam 6L1 is focused on the ideal wavefront output port 6C, while the second light beam 6L2 is focused on the point light source output port 6D. The numerical aperture of the second light beam 6L2 having passed through the focusing mirror set 609 is greater than or equal to the object numerical aperture of the measured optical system 8. The structure and role of the object plane mask 606 are ditto to those on the second embodiment of the ideal wavefront generator 6. The input light from the first input port 6A is transformed into a standard spherical wave and is outputted from the ideal wavefront output port 6C.

FIG. 8 shows multiple schematic diagrams of multiple embodiments of the image wavefront detection unit 9 of the present invention. The image wavefront detection unit 9 is composed of the image mask 901, the photoelectric sensor 902, and the support 903. The image mask 901 is situated on the image plane of the measured optical system 8. Along the advancing direction of light and subsequent to the image mask 901 is arranged the photoelectric sensor 902. The support 902 is a mechanical component supporting the image mask 901 and the photoelectric sensor 902.

The photoelectric sensor 902 as shown on FIG. 8(a) comprises a transform optical mirror set 902a and the two-dimensional detector 902b. The image mask 901 is situated on a front focus plane of the transform optical mirror set 902a, while the two-dimensional detector 902b is situated on a rear focus plane thereof. The transform optical mirror set 902a is an imaging-capable single lens, while the two-dimensional detector 902b is a CCD.

The support 903 as shown on FIG. 8(b) comprises a fixed component 903a and a precision adjusting component 903b. The precision adjusting component 903b is supported on the fixed component 903a, the image mask is supported on the precision adjusting component 903b, and the photoelectric sensor 902 is supported on the fixed component 903a. The precision adjusting component 903b during system operation precision adjusts the position of the image mask 901 to realize precision alignment, while the fixed component 903a remains immovable during system operation. The precision adjusting component 903b employs an adjusting stage of piezoelectric ceramic with nano resolution and three tuning degrees of freedom XYZ.

The precision alignment is realized by means of adjusting the position of the image mask 901, so that the ideal wavefront output port 6C of the ideal wavefront and point light source generator 6 is aligned with the center of the filtering circular hole 901a of the image mask 901 via an image point of the measured optical system 8, and an image point of the point light source output port 6D is situated within the transmittance band 901b of the image mask 901, or that the image points of the two output ports (the ideal wavefront output port 6C and the point light source output port 6D) of the ideal wavefront and point light source generator 6 are both situated within the transmittance band 901b of the image mask 901.

The photoelectric sensor 902 as shown on FIG. 8(c) comprises solely the two-dimensional detector 902b. The two-dimensional detector 902b is disposed subsequent to the image mask 901 along the advancing direction of light, and is parallel to the image mask 901. The support 903 as shown on FIG. 8(a) or FIG. 8(c) comprises only the fixed component 903a, with the precision adjusting component 903b being absent.

When the support 903 comprises the precision adjusting component 903b, the image precision adjusting stage 10 is a multi-degrees-of-freedom shifting stage or adjusting frame capable of adjusting the position of the image wavefront detection unit 9. By means of adjustment via the image precision adjusting stage 10, the output ports (the ideal wavefront output port 6C and the point light source output port 6D) of the ideal wavefront and point light source generator 6 are aligned with the image mask 901 via an image point of the measured optical system 8, that is, enter the precision adjustment range of the precision adjusting component 903b of the support 903.

When the support 903 comprises only the fixed component 903a, but not the precision adjusting component 903b, said precision alignment is realized via the image precision adjusting stage 10 solely.

FIG. 9 shows multiple schematic diagrams of multiple embodiments of the image mask 901 of the present invention. The image mask 901 as shown on FIG. 9(a) or FIG. 9(b) comprises a transmittance band 901b and a filtering circular hole 901a. The filtering circular hole 901a is a transmittance hole with a diameter smaller than the object diffraction limited resolution of the measured optical system 8, and satisfying $\Phi_i < \lambda/(2NA_o)$, where $\lambda$ is the wavelength of the light source, and $NA_i$ is the object numerical aperture of the measured optical system 8. The transmittance band 901b is a transmittance region for the image dispersion speckle to pass without blockade through the ideal wavefront output port 6C or the point light source output port 6D and be imaged via the measured optical system 8. The transmittance band 901b as shown on FIG. 9(a) is in a form of a square with a geometrically similar and smaller one cut out at its center, while the one as shown on FIG. 9(b) is in the form of a circular ring. The transmittance band 901b and the filtering circular hole 901a regions in the image mask 901 are light transparent, while the other regions thereof are light opaque with a shielding layer. The filtering circular hole 901a is situated at the center of the opaque region within the inner boundary of the transmittance band 901b. The transmittance band 901b has two boundaries, with the inner boundary 901b_S1 being more proximate to the filtering circular hole 901a, and the shortest distance from the center of the filtering circular hole 901a to the inner boundary 901b_S1 being slightly greater than the radius of the image dispersion speckle of the measured optical system 8.

The shielding layer is a layer made of chromium, aluminum or other metals, or a Mo/Si multi-layer membrane which substantially attenuates light passing therethrough.

As shown on FIG. 9(c), the transmittance band 901b of the image mask 901 is composed of two separated regions, a first transmittance band region 901b1, and a second transmittance band region 9012, with the image mask 901 further comprising a filtering circular hole 901a. The characteristic of the filtering circular hole 901a is identical to those of its counterparts as are shown on FIG. 9(a) and FIG. 9(b). Both the first transmittance band region 901b1 and the second transmittance band region 9012 are each a transmittance region in quadrangle for the image dispersion speckle to pass without blockade through the ideal wavefront output port 6C or the point light source output port 6D and be imaged via the measured optical system 8. The first transmittance band region 901b1, the second transmittance band region 9012 and the filtering circular hole 901a in the image mask 901 are light transparent, while the other regions thereof are light opaque with a shielding layer. The first transmittance band region 901b1 and the second transmittance band region 9012 are respectively on the left and right side of the filtering circular hole 901a. Both the first transmittance band region 901b1 and the second transmittance band region 9012 each has only one boundary, being respectively the 901b1_S1 and 901b2_S1, while the shortest distances from the center of the filtering circular hole 901a to the boundaries 901b1_S1 and 901b2_S1 are both slightly greater than the radius of the image dispersion speckle of the measured optical system 8.

The image mask 901 as shown on FIG. 9(d) comprises a transmittance band 901b, a first filtering circular hole 901a1, and a second filtering circular hole 901a2; the characteristics of the first filtering circular hole 901a1 and the second filtering circular hole 901a2 is identical to those of their counterparts as are shown on FIG. 9(a) and FIG. 9(b). The transmittance band 901b is a transmittance region in quadrangle for the image dispersion speckle to pass without blockade through the ideal wavefront output port 6C or the point light source output port 6D and be imaged via the measured optical system 8. The transmittance band 901b, the first filtering circular hole 901a1 and the second filtering circular hole 901a2 in the image mask 901 are regions transparent to light, while the other regions are opaque to light with a shielding layer. The first filtering circular hole 901a1 and the second filtering circular hole 901a2 are respectively on the left and right side of the transmittance ban 901b. The transmittance band 901b has only one boundary 901b-S1, with the shortest distances thereto from the first filtering circular hole 901a1 and the second filtering circular hole 901a2 both being slightly greater than the radius of the image dispersion speckle of the measured optical system 8.

The image mask 901 as shown on FIG. 9(e) comprises a transmittance band 901b and a filtering circular hole 901a, and as contrasted to that on FIG. 9(d), it has only one filtering circular hole 901a, which may occupy the position of either the first filtering circular hole 901a1 or the second filtering circular hole 901a2, the other characteristics being identical to those on FIG. 9(d).

Figure 10:
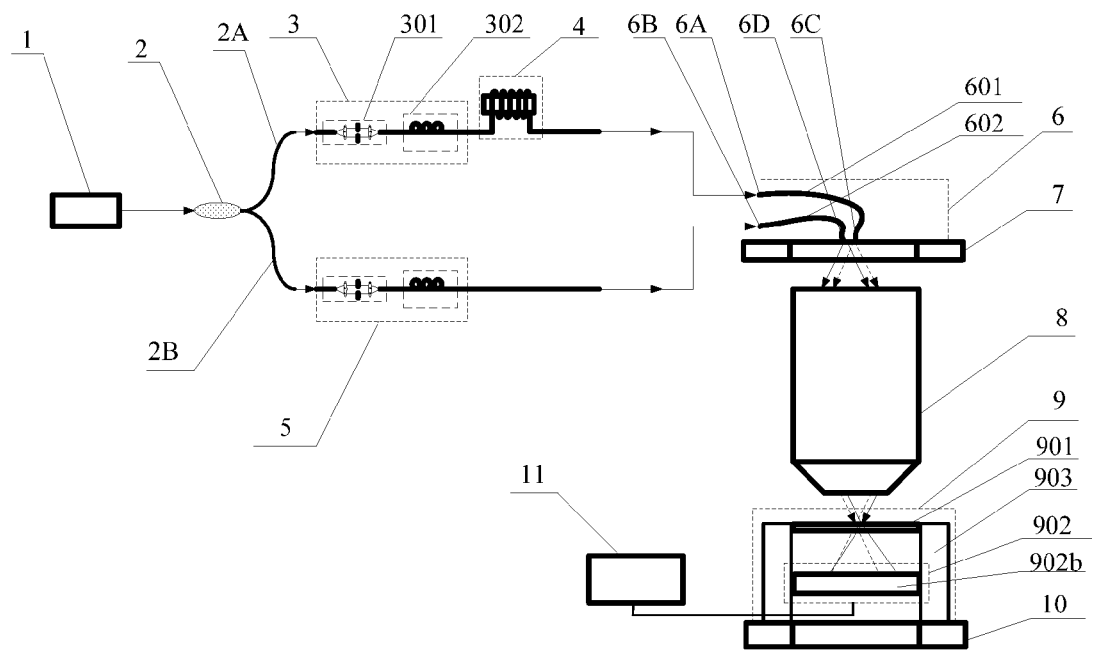
FIG. 10 is a schematic diagram of an embodiment of the point diffraction interferometric wavefront aberration measuring device of the present invention.

FIG. 10 is a schematic diagram of an embodiment of the point diffraction interferometric wavefront aberration measuring device of the present invention. The light source 1 is a laser with single mode fiber output. The optical splitter 2 is an optical fiber coupler. The first light intensity and polarization regulator 3 is composed of the adjustable attenuator 301 and the polarization controller 302, with both the adjustable attenuator 301 and the polarization controller 302 being each a fiber component, and the adjustable attenuator 301 being arranged prior to the polarization controller 302 along the advancing direction of light; the adjustable attenuator 301 is composed of a fiber, a fiber collimating lens, an adjustable diaphragm, a fiber coupling lens, and another fiber, which are successively connected. The polarization controller 302 is composed of a fiber quarter wave plate, a fiber half wave plate, and another fiber quarter wave plate, which are successively connected. The phase shifter adopts the structure as shown on FIG. 3(a). The second light intensity and polarization regulator 5 is structurally identical to the first light intensity and polarization regulator 3. The light path adjustable light path 2A and the light-path-fixed light path 2B are fiber light paths. The ideal wavefront and point light source generator 6 adopts the structure as shown on FIG. 4. The object precision adjusting stage 7 is implemented by means of a six dimensional precision shifting stage with three linear degrees of freedom X, Y, and Z, and three rotational degrees of freedom Xθ, Yθ, and Zθ. The measured optical system 8 is a reduced projection lens. The image wavefront detection unit 9 adopts the structure as shown on FIG. 8(c); the image mask 901 adopts the structure as shown on FIG. 9(b), with the advantage of adoption of a circular ring by the transmittance band 901b being reduced difficulty of alignment in step 2). The image precision adjusting stage 10 is also a six dimensional precision shifting stage with three linear degrees of freedom X, Y, and Z, and three rotational degrees of freedom Xθ, Yθ, and Zθ. The data processing unit 11 is a computer for storage of interferograms, and for obtaining wavefront aberration via processing the interferograms.

Figure 11:
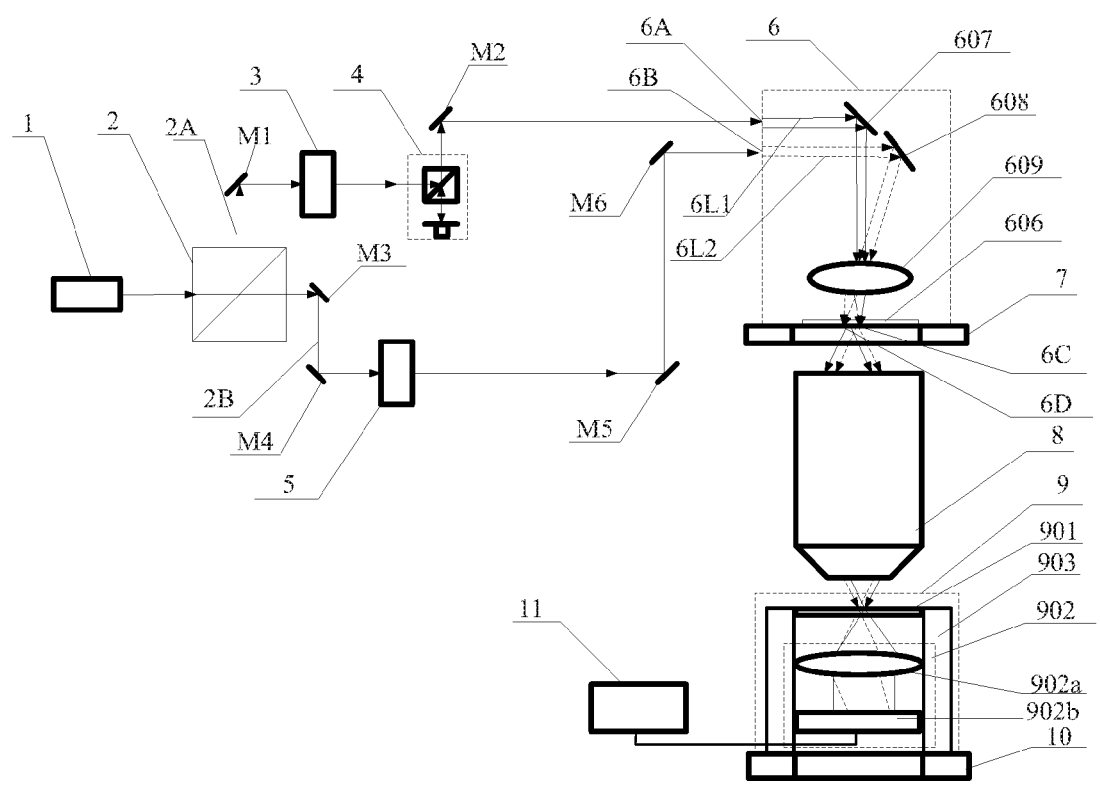
FIG. 11 is a schematic diagram of another embodiment of the point diffraction interferometric wavefront aberration measuring device of the present invention.

FIG. 11 is a schematic diagram showing a second embodiment of the point diffraction interferometric wavefront aberration measuring device of the present invention. The optical source 1 is a laser with free space parallel light output. The optical splitter 2 is a beam splitter lens. The first light intensity and polarization regulator 3 is a rotating glass with different attenuating foils plated on its different sector regions, and which only regulates light power. The phase shifter 4 adopts the structure as shown on FIG. 3(*b*). The second light intensity and polarization regulator 5 is an adjustable diaphragm which only regulates light power. The light path adjustable light path 2A and the light-path-fixed light path 2B are free space light paths. The reflectors M1 and M2 on the light path adjustable light path 2A, and the reflectors M3, M4, M5, and M6 on the light-path-fixed light path 2B are merely employed for changing transmission direction of light. The ideal wavefront and point light source generator 6 adopts the structure as shown on FIG. 7. The image wavefront detection unit 9 adopts the structure as shown on FIG. 8(*a*). The image mask 901 adopts the structure as shown on FIG. 9(*a*). Those that are not mentioned follow the first embodiment on FIG. 10.

A detecting method employing the point diffraction interferometric wavefront aberration measuring device of the present invention as described on FIG. 10 and FIG. 11 for detecting the wavefront aberration of the measured optical system comprise the following steps:

1) moving the object precision adjusting stage 7 so that the ideal wavefront output port 6C of the ideal wavefront and point light source generator 6 is situated in a position of a field of view point for detection of the measured optical system 8;

2) moving the image precision adjusting stage 10 so that the image point of the ideal wavefront output port 6C of the ideal wavefront and point light source generator 6 is aligned with the center of the filtering circular hole 901*a* of the image mask 901, and the image point of the point light source output port 6D is situated inside the transmittance band 901*b* of the image mask 901;

3) adjusting the first light intensity and polarization regulator 3 and the second light intensity and polarization regulator 5, so that the intensity of the interferogram collected by the photoelectric sensor 902 reaches 0.6-0.9 of the saturation intensity of the photoelectric sensor 902, and the interference visibility thereof reaches above 0.6; the phase shifter 4 and the photoelectric sensor 902 repeat for 5 times of phase shifting for a phase shift phase $\pi/2$ and collecting an interferogram, which are successively $\pi/2$ phase shift phase apart, and are denoted as Ia1, Ia2, Ia3, Ia4, and Ia5; conducting phase extraction on the sequence of the interferograms according to the algorithm as shown on the expression (5) to obtain a wrapper phase distribution $WR_a$ and conducting phase-unwrapping on $WR_a$ to obtain a phase distribution $W_a$;

$$WR_a = \tan^{-1}\left(\frac{I_{a4} - I_{a2}}{I_{a1} - I_{a3}}\right) \tag{5}$$

4) moving the image precision adjusting stage 10 and conducting a precision alignment, so that the image points of the ideal wavefront output port 6C and the point light source output port 6D are both situated inside the transmittance band 901*b* of the image mask 901;

5) adjusting the first light intensity and polarization regulator 3 and the second light intensity and polarization regulator 5, so that the intensity of the interferogram collected by the photoelectric sensor 902 reaches 0.6-0.9 of the saturation intensity of the photoelectric sensor 902, and the interference visibility thereof reaches above 0.6; the phase shifter 4 and the photoelectric sensor 902 repeat for 4 times of phase shifting for a phase shift phase $\pi/2$ and collecting an interferogram, to obtain a sequence of 4 interferograms, which are successively $\pi/2$ phase shift phase apart, and are denoted as Ib1, Ib2, Ib3, and Ib4; conducting phase extraction on the sequence of the interferograms according to the algorithm as shown on the expression (6) to obtain a wrapper phase distribution $WR_b$ and conducting phase-unwrapping on $WR_b$ to obtain a phase distribution $W_b$;

$$WR_b = \tan^{-1}\left(\frac{I_{b4} - I_{b2}}{I_{b1} - I_{b3}}\right) \tag{6}$$

6) calculating the wave aberration W of the measured optical system 8 at the field of view point via the expression $W=W_a-W_b$.

The algorithm of the phase extraction is expressed in arctangent, with the phase distribution truncated into multiple regions in a range of $2\pi$, called wrapped phases; to finally obtain the continuous phase data, the multiple regions of the truncated phases are spliced and expanded to be a continuous phase, the procedure being named as phase unwrapping.

The above described embodiments have the following advantages: high fringe visibility, elimination of system errors, reduced system complexity and operation complexity, and high light use efficiency.

The measuring device of the present invention needs only to generate one path of a standard spherical wave output on an object plane of the measured optical system, thereby reducing system complexity and raising light use efficiency; the measuring system reduces precision requirement and operating complexity of the system as well.

We claim:

1. A device for measuring point diffraction interferometric wavefront aberration, comprising:
   an optical source,
   an optical splitter,
   a first light intensity and polarization regulator,
   a phase shifter,
   a second light intensity and polarization regulator,
   an ideal wavefront and point light source generator having a first input port, a second input port, an ideal wavefront output port, a point light source output, and an output numerical aperture,
   an object precision adjusting stage,
   a measured optical system, the measured optical system comprising an object plane, an object numerical aperture and an image point dispersion speckle,
   an image wavefront detection unit, said image wavefront detection unit comprising an image mask, a photoelectric sensor, and a support, the image mask comprising a transmittance band and a filtering circular hole, and the photoelectric sensor comprising a two-dimensional detector,
   an image precision adjusting stage, and
   a data processing unit,
   wherein the ideal wavefront and point light source generator is an optical component that transforms a light inputted from the first input port to a standard spherical wave in a scope of the object numerical aperture of the measured optical system that is subsequently outputted from the ideal wavefront output port, and transforms a light of the second input port to the point light source, the light is not an ideal spherical wave, and the output numerical aperture is equal to or greater than the object numerical aperture of the measured optical system, and the light is subsequently outputted from the point light source output port;

a center distance ($s_o$) between the ideal wavefront output port and the point light source output port is greater than a ratio of a diameter of the image point dispersion speckle of the measured optical system over an amplification factor;

the image mask is situated on the image plane of the measured optical system, the photoelectric sensor is arranged along the advancing direction of light and subsequent to the image mask, and the support is a mechanical component supporting the image mask and the photoelectric sensor; and the ideal wavefront output port is situated on the object plane of the measured optical system, and the point light source output port is situated on or is proximate to the object plane of the measured optical system.

2. The device for measuring point diffraction interferometric wavefront aberration as described in claim 1, wherein the first light intensity and polarization regulator comprises an adjustable attenuator and a polarization controller; and the adjustable attenuator is connected prior to or subsequent to the polarization controller along the advancing direction of light.

3. The device for measuring point diffraction interferometric wavefront aberration as described in claim 1, wherein the first light intensity and polarization regulator comprises a polarization analyzer and a rotary stage; and the rotary stage rotates the polarization analyzer to change a direction of a transmission axis of the polarization analyzer, thereby changing the polarization and light intensity of the output light.

4. The device for measuring point diffraction interferometric wavefront aberration as described in claim 1, wherein the first light intensity and polarization regulator comprises a polarization controller and a polarization analyzer;

the polarization controller and the polarization analyzer are successively connected along the advancing direction of light; and by adjusting the polarization of light via the polarization controller, light intensity of the polarization analyzer is changed.

5. The device for measuring point diffraction interferometric wavefront aberration as described in claim 1, wherein the first light intensity and polarization regulator is an adjustable attenuator and only adjusts light power along the light path.

6. The device for measuring point diffraction interferometric wavefront aberration as described in claim 1, wherein the phase shifter comprises a columnar piezoelectric ceramic and a single-mode fiber loop winding thereon; and by changing a driving voltage of the columnar piezoelectric ceramic, a diameter of the columnar piezoelectric ceramic is changed, and a length of the single-mode fiber loop and the light path is changed.

7. The device for measuring point diffraction interferometric wavefront aberration as described in claim 1, wherein the phase shifter comprises a beam splitter prism, a reflector, and a piezoelectric ceramic;

the beam splitter prism is arranged along a direction of an incident light, and the reflector is arranged in a direction of the reflection light of the beam splitter prism;

the light reflected by the reflector comes out via the beam splitter prism; and as the reflector is mounted on the piezoelectric ceramic, by changing the driving voltage of the piezoelectric ceramic, the length of the piezoelectric ceramic is changed to move the reflector, thus changing the light path.

8. The device for measuring point diffraction interferometric wavefront aberration as described in claim 1, wherein the ideal wavefront and point light source generator comprises a first fiber and a second fiber;

an input port of the first fiber is an first input port of the ideal wavefront and point light source generator;

an output port of the first fiber is the ideal wavefront output port of the ideal wavefront and point light source generator; and an input port of the second fiber is the second input port of the ideal wavefront and point light source generator, and an output port of the second fiber is the point light source output port of the ideal wavefront and point light source generator.

9. The device for measuring point diffraction interferometric wavefront aberration as described in claim 1, wherein the ideal wavefront and point light source generator comprises a third fiber, a fourth fiber, an imaging mirror set, and an object plane mask;

an input port of the third fiber is the first input port of the ideal wavefront and point light source generator, and an output port of the third fiber is on an object plane of the imaging mirror set;

an input port of the fourth fiber is the second input port of the ideal wavefront and point light source generator, and an output port of the fourth fiber is on an object plane of the imaging mirror set;

the object plane mask is on an image plane of the imaging mirror set;

a first circular hole and a second circular hole are arranged on the object plane mask;

the first circular hole is the ideal wavefront output port of the ideal wavefront and point light source generator, and the second circular hole is the point light source output port of the ideal wavefront and point light source generator; and the output port of the third fiber is imaged on the first circular hole via the imaging mirror set, and the output port of the fourth fiber is imaged on the second circular hole via the imaging mirror set.

10. The device for measuring point diffraction interferometric wavefront aberration as described in claim 1, wherein the ideal wavefront and point light source generator comprises a first reflector, a second reflector, a focusing mirror set, and an object plane mask;

a first light beam and a second light beam of collimated light are respectively inputted from the first input port and the second input port of the ideal wavefront and point light source generator;

the first reflector, the focusing mirror set, and the object plane mask are successively arranged along the advancing direction of the first light beam;

the second reflector, the focusing mirror set, and the object plane mask are successively arranged along the advancing direction of the second light beam;

the object plane mask is on a rear focus plane of the focusing mirror set;

a first circular hole on the object plane mask is the ideal wavefront output port of the ideal wavefront and point light source generator, and a second circular hole on the object plane mask is the point light source output port of the ideal wavefront and point light source generator;

an angle exists between the first reflector and the second reflector so that the first light beam is focused on the ideal wavefront output port and the second light beam is focused on the point light source output port; and a numerical aperture of the second light beam, having passed through the focusing mirror set, is greater than or equal to the object numerical aperture of the measured optical system.

11. The device for measuring point diffraction interferometric wavefront aberration as described in claim 1, wherein the photoelectric sensor of the image wavefront detection unit comprises a transform optical mirror set and the two-dimensional detector;

the image mask is situated on a front focus plane of the transform optical mirror set, and the two-dimensional detector is situated on a rear focus plane of the transform optical mirror set;

the transform optical mirror set is an imaging-capable single lens, and the two-dimensional detector is a CCD, and the support comprises only a fixed component, and a precision adjusting component is not on the support.

12. The device for measuring point diffraction interferometric wavefront aberration as described in claim 1, wherein the support of the image wavefront detection unit comprises a fixed component and a precision adjusting component;

the precision adjusting component is supported on a fixed component, the image mask is supported on the precision adjusting component, and the photoelectric sensor is supported on the fixed component; and the precision adjusting component during system operation precision adjusts the position of the image mask to realize precision alignment, and the fixed component remains immovable during system operation.

13. The device for measuring point diffraction interferometric wavefront aberration as described in claim 1, wherein the photoelectric sensor of the image wavefront detection unit is a two-dimensional detector;

the two-dimensional detector is disposed subsequent to the image mask along the advancing direction of light, and is parallel to the image mask; and the support comprises only a fixed component, and a precision adjusting component is not on the support.

14. The device for measuring point diffraction interferometric wavefront aberration as described in claim 1, wherein the image mask comprises a transmittance band and a filtering circular hole;

the filtering circular hole is a transmittance hole with a diameter smaller than the object diffraction limited resolution of the measured optical system and satisfying $\Phi_i < \lambda/(2NA_o)$, where $\lambda$ is the wavelength of the light source, and $NA_i$ is the object numerical aperture of the measured optical system;

the transmittance band is a transmittance region for the image dispersion speckle to pass without blockade through the ideal wavefront output port or the point light source output port and be imaged via the measured optical system; and the transmittance band is in a form of a square with a geometrically similar and smaller one cut out at its center.

15. The device for measuring point diffraction interferometric wavefront aberration as described in claim 1, wherein the image mask comprises a transmittance band and a filtering circular hole;

the filtering circular hole is a transmittance hole with a diameter smaller than the object diffraction limited resolution of the measured optical system and satisfying $\Phi_i < \lambda/(2NA_o)$, where $\lambda$ is the wavelength of the light source, and $NA_i$ is the object numerical aperture of the measured optical system;

the transmittance band is a transmittance region for the image dispersion speckle to pass without blockade through the ideal wavefront output port or the point light source output port and be imaged via the measured optical system; and the transmittance band is in a form of a circular ring.

16. The device for measuring point diffraction interferometric wavefront aberration as described in claim 1, wherein the transmittance band of the image mask comprises a first transmittance band region and a second transmittance band region, and the image mask further comprises a filtering circular hole;

the first transmittance band region and the second transmittance band region are each a transmittance region in quadrangle for the image dispersion speckle to pass without blockade through the ideal wavefront output port or the point light source output port and be imaged via the measured optical system; and the first transmittance band region, the second transmittance band region, and the filtering circular hole in the image mask are light transparent, and the other regions of the image mask are light opaque with a shielding layer.

17. The device for measuring point diffraction interferometric wavefront aberration as described in claim 1, wherein the image mask comprises a transmittance band, a first filtering circular hole, and a second filtering circular hole;

the transmittance band is a transmittance region in quadrangle for the image dispersion speckle to pass without blockade through the ideal wavefront output port or the point light source output port and be imaged via the measured optical system; and the transmittance band, the first filtering circular hole, and the second filtering circular hole in the image mask are regions transparent to light, and other regions of the image mask are opaque to light with a shielding layer.

18. The device for measuring point diffraction interferometric wavefront aberration as described in claim 1, wherein the image mask comprises a transmittance band and a single filtering circular hole; and the single filtering circular hole occupies a position of either the first filtering circular hole or the second filtering circular hole.

19. A method for detecting a wavefront aberration of the measured optical system of the point diffraction interferometric wavefront aberration measuring device of claim 1, comprising moving an object precision adjusting stage so that the ideal wavefront output port of the ideal wavefront and point light source generator is situated in a position of a field of view point for detection of the measured optical system, moving an image precision adjusting stage and conducting a precision alignment, so that an image point of the ideal wavefront output port of the ideal wavefront and point light source generator is aligned with a center of a filtering circular hole of the image mask, and an image point of the point light source output port is situated inside a transmittance band of the image mask, adjusting a first light intensity and polarization regulator and a second light intensity and polarization regulator so that an intensity of an interferogram collected by the photoelectric sensor reaches 0.6-0.9 of a saturation intensity of the photoelectric sensor, and an interference visibility of the interferogram reaches above 0.6, phase shifting for a phase shift phase δ via the phase shifter for m times, m is a positive integer greater than 2, with each time the photoelectric sensor collecting an interferogram, to obtain a sequence of m interferograms: Ia1, Ia2, . . . , Iam, conducting phase extraction and phase-unwrapping on the sequence of the m interferograms to obtain a phase distribution $W_a$, conducting precision alignment so that image points of the output ports of the ideal wavefront and point light source generator are situated inside the transmittance band of the image mask, adjusting the first light intensity and polarization regulator and the second light intensity and polarization regulator so that an intensity of another interferogram collected by the photoelectric sensor reaches 0.6-0.9 of the saturation intensity of the photoelectric sensor, and an interference visibility thereof reaches above 0.6, phase shifting for a phase shift phase δ via the phase shifter for m times, m is a positive integer greater than 2, with each time the photoelectric sensor collecting an interferogram, to obtain a sequence of m interferograms Ia1, Ia2, . . . , Ibm, conducting phase extraction and phase-unwrapping on the sequence of the m interferograms to obtain another phase distribution $W_b$, and calculating the wave aberration W of the measured optical system at the field of view point via an expression $W=W_a-W_b$.

\* \* \* \* \*